J. A. LANG.
DIFFERENTIAL GEARING.
APPLICATION FILED APR. 25, 1914.

1,154,641.

Patented Sept. 28, 1915.
2 SHEETS—SHEET 2.

Witnesses

J. A. Lang,
Inventor by C. A. Snow & Co.
Attorneys

UNITED STATES PATENT OFFICE.

JOHN ALBERT LANG, OF CARTHAGE, NORTH CAROLINA.

DIFFERENTIAL GEARING.

1,154,641.     Specification of Letters Patent.     Patented Sept. 28, 1915.

Application filed April 25, 1914. Serial No. 834,538.

*To all whom it may concern:*

Be it known that I, JOHN A. LANG, a citizen of the United States, residing at Carthage, in the county of Moore and State of North Carolina, have invented a new and useful Differential Gearing, of which the following is a specification.

The present invention relates to improvements in differential gearings, one object of the invention, being the provision of a differential gearing in which the number of parts is greatly reduced, and in which a single intermediate and large gear, either of a bevel or worm type, is operated by the driving element and through ratchet and pawl devices properly transmits motion to the driven axle.

A further object of the present invention is the provision of a differential gearing, in which the two driven axles are operably connected to a single intermediate gear through a pawl and ratchet device, which permits of the proper differential action between the two under varying loads, and when rounding curves.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
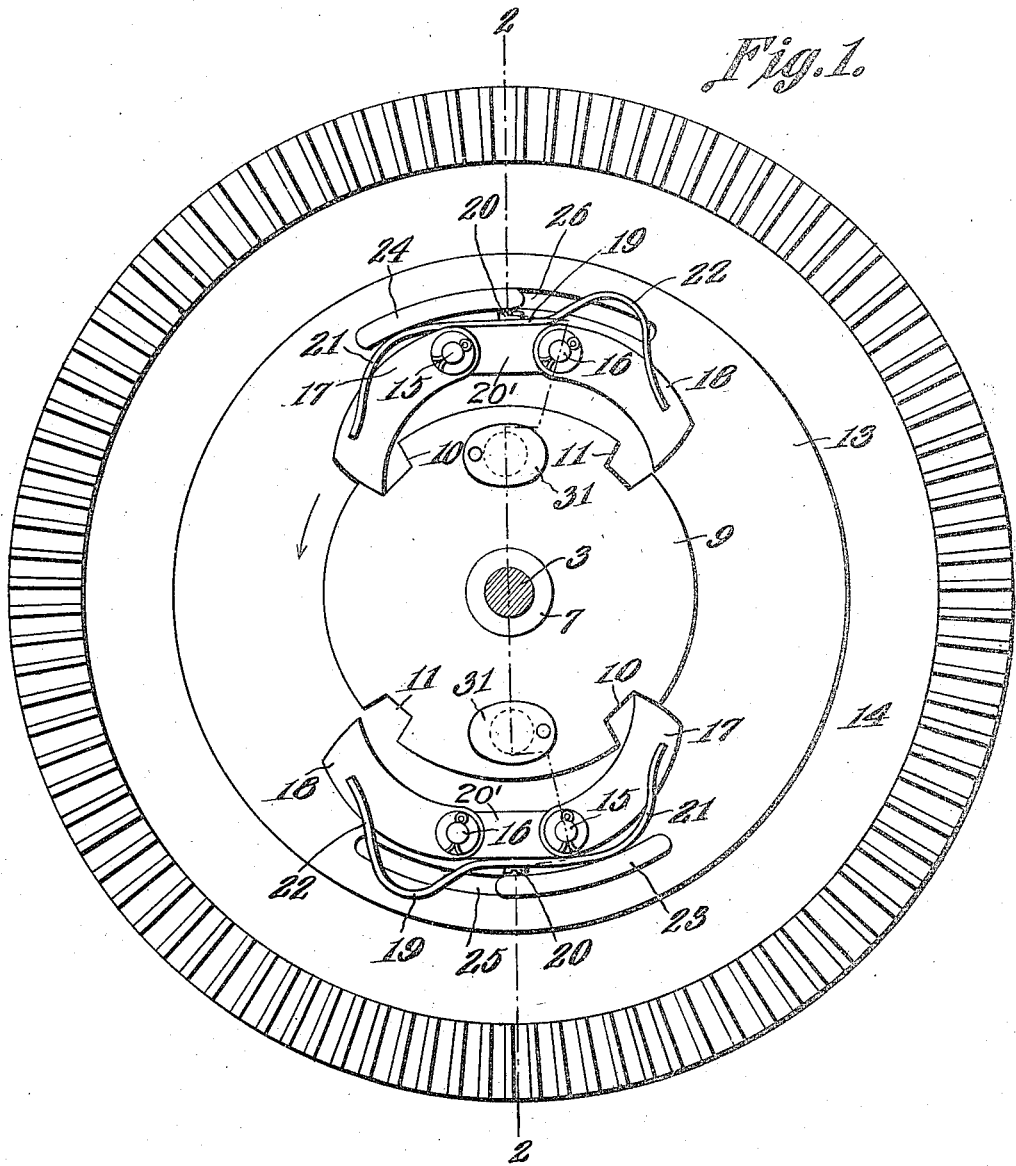
Figure 2:
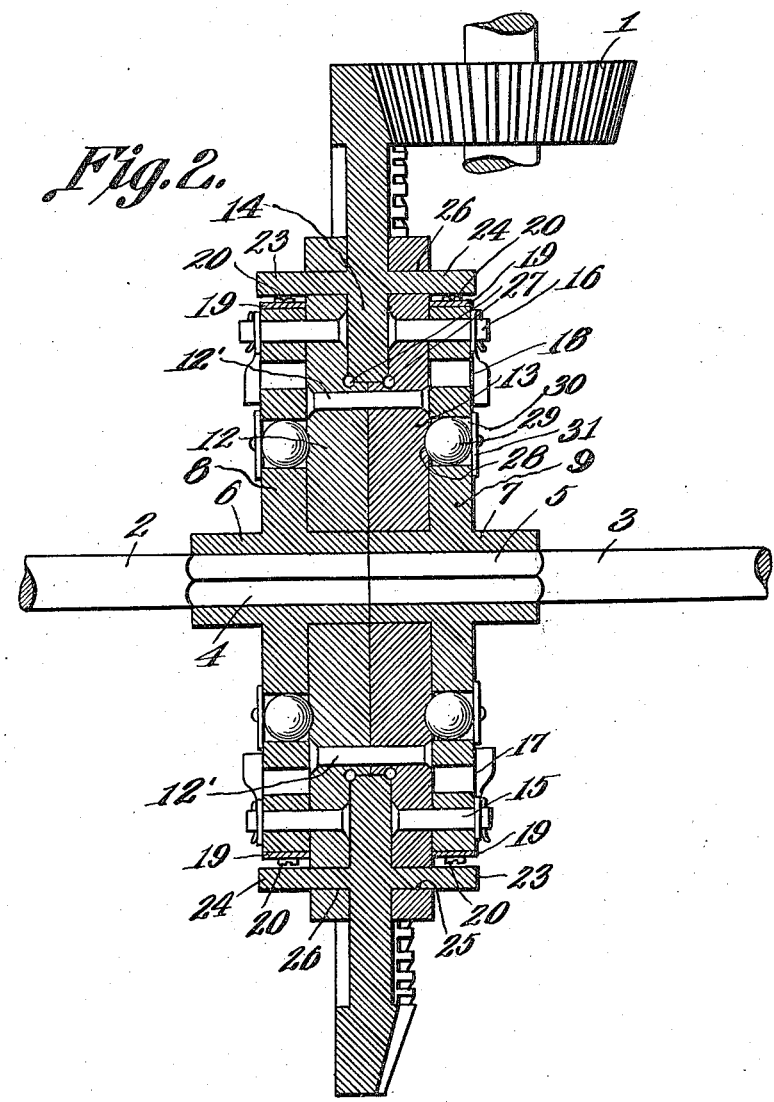

In the drawings—Figure 1 is a plan view taken from the gear side of the main intermediate gear showing the pawl and ratchet device in operable relation. Fig. 2 is a section taken on line 2—2 of Fig. 1 showing the driving gear in position.

Referring to the drawings, the numeral 1 designates the driving gear, while the numerals 2 and 3 designate the two driven shafts, each of which is provided with its respective angular or squared end 4 and 5 for introduction within the angular bores of the two sleeves 6 and 7.

The sleeve 6 is provided with the disk 8 while the sleeve 7 is provided with a disk 9, and each disk is provided with two pairs of recesses 10 and 11 whereby said disks 8 and 9 constitute the ratchet member of the present device. Two disks 12 and 13 are connected by rivets 12′ and are journaled upon the inner ends of the sleeves 6 and 7 between the ratchet disks 8 and 9, while disposed in the annular space between the two disks 12 and 13 is the driving disk 14, whose periphery may either be a bevel or a worm gear as may be deemed most expedient for operative connection with the dirving member 1. The ball bearings 27 are mounted to reduce the friction at this point.

Two pawls 17 and 18 are carried by each disk 12 and 13 at diametrically opposite points, as particularly illustrated in Fig. 1, each having its respective pivoting pin 15 or 16 as there illustrated, a double terminal spring 19 being secured by the bolt 20 to the lug 20′ of the respective disk 12 or 13 so that its free terminals 21 and 22 will bear against the respective pawls 17 and 18 to hold the same outwardly and out of engagement with the respective recesses 10 or 11 of the disks 8 and 9.

In order to operate the respective pawls 17 and 18 so that they may be moved into engagement with the respective recesses 10 and 11 and be there held during the driving of the respective shafts 2 and 3, the arms 23 and 24 are provided and extend in opposite directions from the respective faces of the gear 14, there being in the present instance four of said arms and such arms being disposed for guidance through the arcuate slots 25 and 26 respectively of the members 12 and 13. Thus it will be seen that when the gear or member 14 is being driven in the direction of the arrow as illustrated in Fig. 1, that the arms 23 and 24 will be moved to engage the spring terminals 21 and consequently depress the respective pawls 17 to engage the recesses 10 of the members 8 and 9, thus locking the members 8 and 9 to the driving member 14 so that the respective shafts 2 and 3 will be driven in the same direction.

In the disks 8 and 9, openings 30 are formed. In the openings 30 are mounted balls 29 pressed inwardly toward the median plane of the structure by means of resilient cover plates 31 mounted on the disks 8 and 9. The balls 29 are received in recesses 28 formed in the outer faces of the disks 12 and 13. Should the wheel on the shaft 3 be on the outside of a curve, and overrun, the disk 9 will click over the pawls 17, the disk 9 rotating more rapidly than the disk 13 in the direction of the arrow in Fig. 1. During this operation, the balls 29 will be carried along with the disk 9 and will ride over the face of the disk 13. Ultimately, when the vehicle is again moving on a straight line, the pawls 17 will coact with the notches 10 of the disk 9, in the manner shown in Fig. 1, the balls 29 being again received in the recesses 28. The balls 29 form an additional holding means which is of peculiar utility when the pawl 17 is being shifted out of engagement with the disk 9 and while the pawl 18 is being shifted into engagement with the disk 9, or vice versa. The balls 29, the cover plates 31 and the recesses 28 constitute in effect a resilient pawl and ratchet connection between the disks 9 and 13 and the disks 12 and 8.

What is claimed is:

1. In a differential gearing, a pair of individually rotatable ratchet wheels; a shaft mounted to rotate with each ratchet wheel; a pair of side disks between the ratchet wheels and having arcuate openings; pawls carried by the side disks and coacting with the ratchet wheels; and a driven member rotatably mounted between the side disks, the rotatable member having transverse projections engaged in the openings to form an operative connection between the driven member and the side disks, the projections being movable in the openings into and out of coacting relation with respect to the pawls.

2. In a differential gearing, a pair of individually rotatable ratchet wheels; a shaft mounted to rotate with each ratchet wheel; a pair of side disks between the ratchet wheels; pawls carried by the side disks and coacting with the ratchet wheels; a driven member rotatably mounted between the side disks, the rotatable member having transverse projections movable with respect to the side disks and adapted to engage the side disks to form an operative connection between the driven rotatable member and the side disks, the projections being movable with the driven member with respect to the disks to cause the projections to be disposed in and out of actuating relation with respect to the pawls.

3. In a differential gearing, a pair of ratchet wheels; a shaft connected with each ratchet wheel; a pair of carrying members; pawls on the carrying members and coacting with the ratchet wheels; a driven member including a combined means for operatively connecting the driven member with the carrying members and for holding the pawls in engagement with the ratchet wheels; and resilient auxiliary retaining mechanisms forming operative connections between the ratchet wheels and the carrying members, the resilient auxiliary retaining mechanisms being releasable under excessive torsional strains in opposite directions.

4. In a device of the class described, a pair of ratchet disks; shafts individual to the ratchet disks; a pair of side disks located between the ratchet disks and provided with arcuate slots; pawls on the side disks and coacting with the ratchet wheels; springs engaging the pawls and comprising bowed portions extended across the slots; and a driven member located between the side disks and comprising lateral projections movable in the slots and adapted to engage the bowed portions of the springs.

In testimony that I claim the foregoing as my own, I have hereto affixed my signature in the presence of two witnesses.

JOHN ALBERT LANG.

Witnesses:
L. W. EDWARDS,
GEO. H. HUMBER.

Copies of this patent may be obtained for five cents each, by addressing the "Commissioner of Patents, Washington, D. C."